3,518,097
METHOD OF PRODUCING DEHYDRATED FRIED POTATOES
Robert Menzi and Claude Giddey, Geneva, Switzerland, assignors to Georges Lesieur & Sees Fils, Paris, France
No Drawing. Filed Mar. 2, 1967, Ser. No. 619,959
Claims priority, application Switzerland, Mar. 22, 1966, 4,128/66
Int. Cl. A23b *7/03;* A23l *1/12*
U.S. Cl. 99—207            6 Claims

---

ABSTRACT OF THE DISCLOSURE

Producing dehydrated French fried potatoes by frying potato pieces at 100° to 110° C. to form a crust which is permeable to water vapor and to water or by frying so as to form a relatively impermeable crust which is then rendered at least partially permeable, by subjecting to vacuum while the pieces are still hot. The fried potato pieces are then freeze-dried.

---

This invention relates to a method of producing dehydrated French fried potatoes.

As is known, French fried potatoes are at present prepared on a small scale from raw potatoes in household or restaurants just before being eaten. The conventional method giving the best results is that which consists in frying the potatoes, after being chopped up into slices, in two stages. The first fry, the purpose of which is to gelatinize the starch and drastically to reduce the moisture content, is carried out for 10 to 20 minutes in oil at a temperature lying between 100° and 140° C. The second fry, the purpose of which is to dessicate the surface of the slices to form thereon a crisp crust, is carried out in oil having a temperature lying between 170° and 200° C. for a very brief period of time—between 1 to 5 minutes—in order not to deteriorate the internal structure of the slices which must remain tender. During this second fry, the color of the slices progressive passes from a pale yellow to a golden yellow.

This method of preparing French fried potatoes thus requires a succession of more or less long and delicate operations. The raw potatoes must be peeled, cut up into slices which are then washed, wiped dry and fried in two stages. The time taken up by all of these operations is relatively long and particular care must be given to some of these operations if it is desired to produce a dish having the required organoleptic properties.

In an endeavour to simplify and to facilitate the housewife's task in preparing French fried potatoes, various products have been put on the market over the past few years which enable some of the operations involved in the conventional method to be eliminated. One of these products consists of frozen raw potato slices ready for the two-stage fry. Another of these products consists of frozen slices which have already been subjected to the first fry. The drawback of these two products is that they must be kept frozen and must then first be thawed before being fried in one or two stages.

With the method according to the present invention, dehydrated French fried potatoes can be produced which can be kept at ambient temperature in ordinary moisture-proof wrapping, and which can then, because of their crispy state, be eaten as they are, or which can then be used for preparing hot and hydrated French fried potatoes by mere rehydratation in cold or hot water and quick frying (the second frying stage of the conventional method). This method comprises frying potato pieces of desired shape so as to cook said pieces and to form thereon either a crust which is permeable to water vapor and to water or a relatively impermeable crust which is subsequently rendered at least partially permeable, freezing the fried potato pieces to a temperature below −10° C., and lyophilizing the frozen potato pieces to reduce their water content to below 8%.

The method thus consists in subjecting potato pieces which have been previously prepared, in known manner, e.g. in the form of slices, dice and balls, to the first fry of a conventional method, i.e. in oil having a temperature lying between 100° and 140° C. The choice of temperature and length of frying time depends on the manner in which it is desired to achieve permeability of the crust to water vapor or to water, an essential requirement for quick lyophilization of the frozen potato pieces and for subsequent rehydration since, in the absence of crust permeability, dessication would be very difficult and time-consuming, even by lyophilization. When the crust is relatively impermeable, i.e. when it forms a barrier through which water vapor can only pass with difficulty, the amount of ice that is evaporated is insufficient to keep the remainder of the ice (the frozen interstitial liquid) below its melting point (about −10° C.). As the result of this partial evaporation, the remaining ice melts, thereby preventing the porosity and the volume of the internal mass of the fried potato pieces from being maintained.

Crust permeability can thus only be achieved by choosing an oil temperature and a length of frying time such that the resulting crust remains very thin and hence permeable. This will be the case when the oil temperature lies between 100° and 110° C. and the length frying time is less than 30 minutes.

However, potatoes that are thus fried, i.e. which have a very thin crust, have very low mechanical strength, this obviously being a drawback for the subsequent operations, in particular when later frying the dehydrated fried potatoes, since the latter are made up of this thin slightly moist crust which is partly dextrinised (physically modified starch) and of an inner mass consisting of gelatinized starch which is still highly hydrated as the overall water content of fried potatoes generally lies between 40 and 50% (the water content of a raw slice being about 80%), so that their rigidity is entirely based on the mechanical resistance of the crust.

It is therefore preferable for the frying operation to be carried out in a manner such as to produce a more resistant and hence a thicker crust which will impart greater rigidity to the fried potatoes. This will be the case when the oil temperature is greater than 110° C. and the length of frying time is greater than 10 minutes. An increase in crust thickness and hence in crust resistance can only be achieved at the expense of its permeability to water vapor and to water. The crust must therefore be made at least partially permeable after it is formed through frying. This permeabilization of the crust can be carried out either before or after freezing of the fried potatoes by making perforations therein with for instance a needle of suitable diameter. The crust could also be permeabilized by removing part of the crust, in particular by cutting off at least one of the ends in the case of slices.

Another method of permeabilizing the crust consists in subjecting the potatoes, when still hot, to the abrupt effect of a high vacuum. The vapor that is suddenly generated swells the potatoes and hence causes cracks to form in the crust. The cooling and freezing of the thus treated potatoes must take place immediately after swelling. Crust permeabilization through swelling has the advantage of increasing the porosity of the inner mass.

The best results are obtained by lowering the pressure in two stages: first progressively, over about 10 seconds, to 300 torr, then abruptly, in about 1 second, down to $6.10^{-2}$ torr. By maintaining this pressure for about 10 minutes, the temperature of the potatoes will progressively decrease to about $-20°$ C., this being sufficient to bring them to the frozen state required for lyophilization.

The crust can also be permeabilized by first swelling the potatoes and then, once frozen, by making perforations in their crust or by removing a portion of the latter.

The freezing of the fried potatoes below $-10°$ C., preferably between $-25°$ and $-35°$ C., can be carried out either in an air stream or by the action of a high vacuum, corresponding to a pressure below 1 mm. Hg, causing intensive evaporation and temperature lowering. In the second case, the potatoes must be subjected to the action of the vacuum while still hot, i.e. after frying and draining.

The described method may for instance be practiced as follows:

EXAMPLE 1

Slices having a square cross-section of 9×9 mm. are prepared in known manner from raw potatoes. They can, if desired, be dipped into a bath of sulphurous, acetic, citric or ascorbic acid in order to stabilize the color. After being wiped dry, the slices are fried for 25 minutes in a bath of ground-nut oil having a temperature set at 105° C. Once removed from the bath and after draining off excess oil, the fried potatoes are frozen in an air stream to $-18°$ C. and are then fed to the lyophilization chamber in which a vacuum is set up such as to produce ice evaporation at $-15°$ C. Depending on the amount of heat imparted to the fried potatoes, the water content thereof will be reduced to 5–2% after about 8 to 12 hours.

Dehydrated fried potatoes are obtained which have a good appearance and which can be eaten as they are or which can be rehydrated and reheated by a quick fry in oil having a temperature lying between 170° and 200° C. The complete rehydration, which can take place either in cold or hot water, is very quickly achieved due to the permeability to water of the crust and to the porosity of the inner mass. The firmness in the rehydrated state is rather slight so that potato slices have to be handled carefully during frying. Once fried they have a good texture.

EXAMPLE 2

Slices prepared as in Example 1, are fried for 25 minutes in an oil bath at a temperature of 112° C. After draining off the excess oil, the slices are perforated by needles having a diameter of 0.5 mm. and a spacing of 3 mm. Freezing and lyophilization are then carried out as in Example 1.

The resulting dehydrated French fried potatoes have properties very similar to those of the potatoes produced according to Example 1, except as regards that their firmness in the rehydrated state which is much greater.

EXAMPLE 3

Slices prepared as in Example 1, are fried for 20 minutes in an oil bath at a temperature of 120° C. After draining off the excess oil, the slices are placed, while still hot (about 50° C.), in a vacuum tunnel, having inlet and outlet air-locks, wherein the pressure is first progressively lowered, over 10 seconds, to 300 torr, then abruptly, in 1 second, down to $6.10^{-2}$ torr. The abrupt effect of the vacuum causes the slices to swell and the intensive evaporation, which then ensues, causes the temperature to drop to $-30°$ C. The slices thus swollen and frozen are then placed in the lyophilization chamber and dehydrated as in Example 1.

The dehydrated fried potatoes have the same properties as those produced according to Example 2 except that full rehydration thereof is achieved less quickly.

EXAMPLE 4

The procedure is the same as in Example 3 up to the freezing stage of the slices. The frozen slices are then perforated with needles having a diameter of 0.5 mm. and a spacing of 3 mm., whereupon they are fed into the lyophilization chamber to be dehydrated therein as in Example 1.

The resulting product has the same properties as that of Example 3 except that full rehydration thereof is achieved more quickly.

EXAMPLE 5

Slices prepared as in Example 1, are fried for 25 minutes in an oil bath at a temperature of 115° C. After draining off the excess oil, the slices are frozen in an air stream to $-30°$ C. whereupon their ends are cut off. They are then introduced into the lyophilization chamber, to be dehydrated therein as in Example 1.

The properties of the resulting product are the same as those of the product of Example 2.

EXAMPLE 6

The procedure is the same as in Example 3 except that the slices are fried for 15 minutes in an oil bath at a temperature of 140° C. After draining, swelling and freezing, the ends of the frozen slices are cut off whereupon the latter are placed in the lyophilization chamber for dessication.

The dehydrated French fried potatoes have the same properties as the product of Example 4.

EXAMPLE 7

Slices prepared as in Example 1, are fried for 15 minutes in an oil bath having a temperature of 140° C. After draining off the excess oil, the slices are frozen in an air stream to $-20°$ C. and then perforated by needles having a diameter of 0.5 mm. and a spacing of 3 mm. The frozen and perforated slices are then placed in the lyophilization chamber to be dehydrated therein as in Example 1.

The resulting product has properties similar to those of the product of Example 2.

In the above examples, the dehydrated fried potatoes are prepared in the form of slices but it will of course be understood that they may be prepared in the same manner in the form of dice, balls, etc.

We claim:
1. A method of producing dehydrated French fried potatoes which comprises frying potato pieces at a temperature between 100° and 110° C. for less than 30 minutes, to form thereon a crust which is permeable to water vapor and water, freezing the fried potato pieces to a temperature below $-10°$ C., and freeze-drying the frozen potato pieces to reduce the water content thereof to below 8%.

2. A method according to claim 1 wherein the fried potato pieces are frozen to a temperature of $-25°$ to $-35°$ C.

3. A method of producing dehydrated French fried potatoes which comprises frying potato pieces at a temperature above 110° C., for more than 10 minutes, to form thereon a crust which is relatively impermeable to water vapor and water, subjecting said pieces while still hot to the effect of an abrupt vacuum to cause swelling thereof and cracks in the crust, and subsequent freezing to a temperature below −10° C. and freeze-drying the potato pieces to reduce the water content thereof to below 8%.

4. A method according to claim 3, wherein the permeability of the crust of said potato pieces is improved by making perforations therein after subjecting same to the effect of said abrupt vacuum.

5. A method according to claim 3 wherein the permeability of the crust of said potato pieces is improved by removing a portion of the crust after subjecting same to the effect of said abrupt vacuum.

6. A method according to claim 3 wherein the fried potato pieces are frozen to a temperature of −25° to −35° C.

References Cited
UNITED STATES PATENTS

| | | | |
|---|---|---|---|
| 3,380,834 | 4/1968 | Janovtchik et al. | 99—207 X |
| 3,395,022 | 7/1968 | Vollink et al. | 99—204 X |

A. LOUIS MONACELL, Primary Examiner

W. A. SIMONS, Assistant Examiner